United States Patent
Loreth et al.

[11] Patent Number: 5,980,614
[45] Date of Patent: *Nov. 9, 1999

[54] AIR CLEANING APPARATUS

[75] Inventors: Andrzej Loreth, Akersberga; Vilmos Torok, Lidingo, both of Sweden

[73] Assignee: TL-Vent AB, Lidingo, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/682,560

[22] PCT Filed: Jan. 17, 1995

[86] PCT No.: PCT/SE95/00038

§ 371 Date: Feb. 10, 1997

§ 102(e) Date: Feb. 10, 1997

[87] PCT Pub. No.: WO95/19225

PCT Pub. Date: Jul. 20, 1995

[30] Foreign Application Priority Data

Jan. 17, 1994 [SE] Sweden .................................. 9400110

[51] Int. Cl.⁶ ..................................................... B03C 3/12
[52] U.S. Cl. .......................... 96/63; 96/69; 96/79; 96/96; 96/97; 96/98
[58] Field of Search .................................. 96/66, 69, 79, 96/87, 96–100, 60–63, 95; 361/230

[56] References Cited

U.S. PATENT DOCUMENTS

| | | | |
|---|---|---|---|
| 2,467,068 | 4/1949 | Wintermute | 96/79 |
| 2,593,869 | 4/1952 | Fruth | 96/96 X |
| 3,181,285 | 5/1965 | Tepolt et al. | 96/79 |
| 4,010,011 | 3/1977 | Reif | 96/61 |
| 4,231,766 | 11/1980 | Spurgin | 361/230 X |
| 4,569,684 | 2/1986 | Ibbott | 96/99 X |
| 4,673,416 | 6/1987 | Sakakibara et al. | 96/79 |
| 4,689,056 | 8/1987 | Noguchi et al. | 96/79 |
| 5,024,685 | 6/1991 | Torok et al. | 96/66 X |

FOREIGN PATENT DOCUMENTS

| | | |
|---|---|---|
| 2652009 | 3/1991 | France . |
| 2501463 | 2/1984 | Germany . |
| 8803057 | 5/1988 | WIPO . |

*Primary Examiner*—Richard L. Chiesa
*Attorney, Agent, or Firm*—Pearne, Gordon, McCoy & Granger LLP

[57] ABSTRACT

An air cleaning apparatus, especially for cleaning of room air, includes an ionizing device (14) having a unipolar ion source formed by a corona discharge electrode, an electrostatic precipitator (12) connected to a high-voltage source (15) and having a flow-through passageway (18) for air to be cleaned and two groups of electrode elements (16, 17) disposed in the flow-through passageway, the electrode elements (16) of one group being interleaved with and spaced from the electrode elements (17) of the other group and arranged to be at a potential different from that of the said other group. The corona discharge electrode (21) is arranged such that the ions generated at the electrode can diffuse essentially freely away from the electrode and thereby diffuse substantially freely throughout the room in which the ionizing device (14) is positioned.

16 Claims, 1 Drawing Sheet

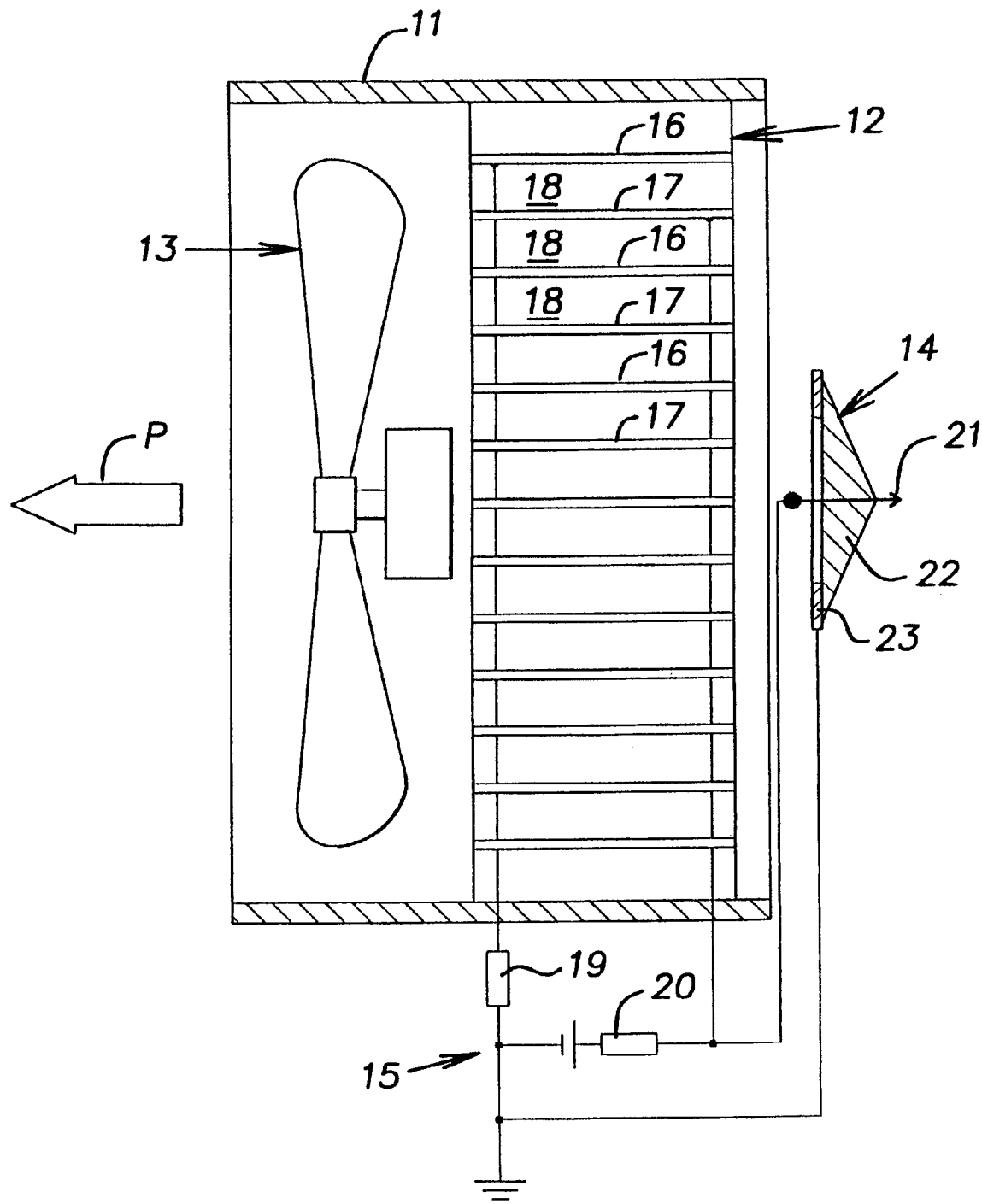

AIR CLEANING APPARATUS

BACKGROUND OF THE INVENTION

The present invention relates to an air cleaning apparatus, especially an apparatus for cleaning of room air. Room air in dwelling rooms, office or other work-rooms, meeting rooms, etc., or in other words, rooms in the ordinary sense of the word. Room air also refers to air in other spaces, such as a space defined by a ventilation duct, which is separated from the open air and thus holds a well-defined body of air.

More particularly, the invention relates to an air cleaning apparatus which comprises an ionizing device having a unipolar ion source formed by a corona discharge electrode, and an electrostatic precipitator connected to a high-voltage source and having a flow-through passageway for the air to be cleaned and two groups of electrode elements disposed in the flow-through passageway, the electrode elements of one group being interleaved with and spaced from the electrode elements of the other group and arranged to be at a potential different from that of the said other group.

Today, air cleaning apparatus of this kind exist in the form of two-stage electrostatic filters in which the ionizing device comprises a corona discharge electrode in an ionizing chamber at the upstream or inlet side of the precipitator. The walls of the ionizing chamber enclose a well-defined space in which the charging of the dust particles takes place more or less simultaneously with the entry of the air into the precipitator. This space may be considered as an upstream extension of the flow-through passageway of the precipitator, because all air that passes through the ionizing chamber and flows past the corona discharge electrode, flows on through the precipitator.

The efficiency of air cleaning apparatus of this kind is dependent on the efficiency of the charging of the dust particles which the airflow through the ionizing chamber carries and which are to be separated from the air in the precipitator.

One way of achieving an efficient charging of the dust particles is to pass a strong corona through the corona discharge electrode, but a strong corona current has the undesirable effect of causing a substantial generation of ozone at the corona discharge electrode.

It is also possible to achieve an efficient charging of the dust particles with a weak corona current by designing the ionization chamber such that the dimension of the space charge region which is defined by the ionizing chamber and through which the airborne particles pass during their travel to the precipitator is large in the direction of flow so that the particles will have a long dwelling time in this region and, consequently, the time available for charging of the particles will also be long. WO93/16807 discloses a two-stage electrostatic filter in which this technique of achieving an efficient charging of the dust particles is embodied. Using the two stage electrostatic filter described in this publication it is possible to achieve a dust separation which is greatly improved over that of other prior art two-stage electrostatic filters, even though the corona current is very weak.

SUMMARY OF THE INVENTION

The present invention provides a radically different way of achieving, in an air cleaning apparatus of the kind initially defined, an efficient separation of dust particles from the air using a very weak corona current.

In practicing the present invention, it has been found that even when the ionizing device is supplied with a very weak corona current, it is possible to achieve a charging of the airborne dust particles that is sufficiently strong to enable an efficient separation in an electrostatic precipitator, without using an ionization chamber in which the dust particles are subjected to an "intensive treatment" shortly before they enter into the precipitator.

Although the air cleaning apparatus according to the invention comprise a unipolar ion source formed by a corona discharge electrode, it has no ionization chamber in the ordinary sense of the word. Instead, the corona discharge electrode is arranged such that the ions produced at the electrode may diffuse away from the electrode substantially freely and fill the entire space, such as a room in a building or a section of a ventilation duct, in which the body of air to be cleaned is enclosed.

In other words, in the air cleaning apparatus according to the invention, the corona electrode is not associated with diffusion barriers or screens that prevent or substantially oppose the free diffusion of the ion cloud in the space, that is, the room in which the ionizer is placed.

The corona discharge electrode may be located practically anywhere in the room. Accordingly, it is basically possible to use as the ionizing device a so-called ionizer of the type available on the market—it may produce positive or negative ions—and place it practically anywhere in the room, regardless of the position of the precipitator. Provided that there are no barriers or screens of the kind mentioned, the cloud of ions produced at the corona discharge electrode will diffuse throughout the room, that is throughout the body of air to be cleaned, and charge the dust particles in it.

However, it may be preferable that the ionizing device is joined with the precipitator, e.g. with the corona discharge electrode mounted on the exterior surface of a housing which enclosed the precipitator and preferably also a fan or other device for transporting air through the precipitator, as well as the required high-voltage source is common to the corona discharge electrode and the precipitator.

Although the housing may itself form a barrier which prevents diffusion of the ion cloud in one direction, straight rearwardly, the ion cloud can still diffuse in the opposite direction, towardly, and laterally and also rearwardly by the sides of the housing, so that it will ultimately fill the entire room.

Accordingly, it is sufficient that there is a region which is free from diffusion barriers at least in one direction and permits the ion cloud to spread freely, so that the ion cloud can reach all parts of the room in which the ionizing device is placed.

It is possible, therefore, to position the corona discharge electrode in an inset, and thus protected, position in the housing, provided of course that the space in the apparatus in which the electrode is positioned is open outwardly such that the outward ion diffusion is not substantially inhibited.

It is preferred to use as the precipitator a capacitor precipitator of a design that permits efficient separation even of particles which are not strongly charged, because the more efficient the separation is, the weaker the corona current can be without sacrificing the cleaning efficiency.

A requirement for an efficient separation is that the electric field strength between adjacent electrode element of the precipitator is always as high as possible, that is, it should always be so high that the precipitator always operates at or only slightly below the field strength at which sparkover occurs. It therefore is advantageous to use a capacitor precipitator of the kind described in WO88/03057 and WO93/16807.

In capacitor precipitators of this kind, the voltage between adjacent electrode elements is automatically and individually, independently of the other electrode element pairs, adjusted to be at or close to the voltage limit of the high-voltage source. Such precipitators can also be advantageously designed as inexpensive and environment-friendly disposable products so that they may be discarded when they have become so loaded with dust that they no longer can effect an adequate separation.

If in such a capacitor precipitator the sparkover limit should be exceeded for an electrode element pair, e.g. as a consequence of dust accumulation on one of the electrode elements of the pair, a discharge (glow discharge) will occur so that a current will flow between the electrode elements, but this current will be very weak because of the high resistivity of the electrode elements and any existing separate current-limiting resistors of the high-voltage source.

At most, the discharge will cause the voltage between the electrode elements of the pair to drop somewhat, namely to a value just about sufficient to maintain the discharge. The electrode elements may therefore still effect precipitation of the charged particles passing between them, albeit at a reduced efficiency because of the lowered voltage. The other electrode element pairs are not affected by the discharge.

Primarily, the invention is suitable for application to air cleaning apparatus designed for airflow rates of 100 cubic metres or more, preferably substantially more, per hour.

BRIEF DESCRIPTION OF THE DRAWING

This invention will be described in greater detail below with reference to the accompanying drawing, the single FIGURE of which shows a longitudinal sectional view of an air cleaning apparatus embodying the invention.

DETAILED DESCRIPTION OF THE PREFERRED EMBODIMENT

The air cleaning apparatus shown in the drawing comprises a housing or enclosure 11 which encloses a readily replaceable electrostatic dust precipitator, generally designated by 12, and an air transporting device in the form of an electrically driven fan 13, which transports air through the apparatus such that the air passes through a flow-through passageway in the dust precipitator. An arrow P indicated the direction of flow of the air, and as is evident from the drawing, the dust separator 12 is positioned upstream of the fan 13.

Associated with the air cleaning apparatus is an ionizing device, namely a so-called ionizer, generally designated by 14, which may be mounted on the housing 11 and thus supported by the housing, but it may also be detached and standing by itself and thus have no mechanical connection with the housing. In operation, the ionizer 14 preferably is positioned in front of the air inlet of the housing 11, or at least near the inlet.

Moreover, the air cleaning apparatus comprises a high-voltage source (direct current source) which is generally designated by 15 in the drawing and which is common to the dust precipitator 12 and the ionizer 14.

The dust precipitator 12 is a capacitor precipitator having two interleaved groups of parallel, preferably plate-like electrode elements 16 and 17 defining between them a large number of subpassageways 18 which jointly form the above-mentioned flow-through passageway for the air to be cleaned. Via a high-ohmic resistor 19 the electrode elements 16 of one group are connected to the negative terminal of the high-voltage source 15, and the electrode element 17 of the other group are similarly connected to the positive terminal via a high-ohmic resistor.

Advantageously, the dust precipitator is constructed as described in WO88/03057 so that at least the electrode elements 17, and preferably also the electrode elements 16, are made of a semiconducting, so-called antistatic or dissipative material, or coated with such a material. Moreover, the connection of at least the electrode elements 17 and suitably also the electrode elements 16, connected to the high-voltage source 15 is accomplished via, in addition to the respective resistors 20 and 19, a strip or bar shaped contact member (not shown) of high-ohmic material.

Alternatively, the dust precipitator 12 may be constructed as described in WO93/16807, the electrode elements in one group, namely the grounded electrode elements, being kept at the required potential with the aid of a separate corona discharge device.

It is also preferable to provide the edges of the electrode elements made of or coated with a semiconducting or antistatic material, or at least that edge, the upstream or leading edge, which is directed against the direction of flow of the air, with a screen of an electrically conducting material as is described in PCT/SE94/00131.

Regardless of which of the above-mentioned constructions is chosen for the dust precipitator 12, the dust precipitator suitably is made from a high-ohmic fibrous material, preferably a cellulose material, such as paper or cardboard.

Within the scope of the invention, the ionizer 14 may be of any suitable type having a corona discharge electrode as a unipolar, positive or negative, ion source, such as an ionizer of any of the commercially available types and constructions.

The ionizer 14 shown only by way of example in the drawing comprises a corona discharge electrode 21 in the shape of a wire or point electrode, which is connected to the positive terminal of the high voltage source 15. It is supported by a holder 22 of an insulating material and encircled by an annular conducting excitation or counter electrode 23 connected to the grounded negative terminal of the high-voltage source. Suitably, the distance between the point of the corona discharge electrode 21 and the adjacent portion of the excitation electrode 23 is greater than 3 cm.

Excitation electrode 23 may also take many other forms than that shown in the drawing. For example, it may be a grounded grid or other grounded air permeable member mounted over the inlet opening of the dust precipitator. If the ionizer comprises a separate excitation electrode corresponding to that which is shown in the drawing, an inlet grid or the like made of plastic may be positioned over the inlet opening.

It is not necessary, but preferable, to use an ionizer comprising a separate excitation electrode as shown in the drawing. For example, the electrode elements of the dust precipitator may serve as the excitation electrode when the ionizer is positioned in front of the dust precipitator at the inlet to the housing 11 of the air cleaning apparatus.

Within the scope of the invention, other modifications of the illustrated embodiments are possible. For example, the corona discharge electrode 21 may be a wire loop or a linear wire electrode.

Moreover, the ionizer 14 may be positioned substantially as desired, although for practical reasons it is preferred that it forms part of the unit comprising the housing 11, the dust precipitator 12, the fan 13 and the high voltage source 15.

One case in which it may be preferred to have the ionizer separated from the rest of the air cleaning apparatus is when the housing 11 with the dust precipitator 12 is inserted in a ventilation duct or the like or for some reason is not suitably placed in the room the air of which is to be cleaned.

Naturally, the ionizer must be positioned such that the ion cloud it generates is not inhibited by screening elements or barriers of some kind from diffusing essentially freely in the room containing the air to be cleaned.

We claim:

1. Air cleaning apparatus comprising, in combination:
   an ionizing device (14) having a unipolar ion source formed by a corona discharge electrode (21) arranged such that ions generated at the electrode can diffuse in at least one direction essentially freely and uninhibited by any barrier away from the electrode into the space containing the air to be cleaned,
   An electrostatic precipitator (12) connected to a high-voltage source (15), said electrostatic precipitator (12) defining a flow-through passageway (18) for air to be cleaned and including first and second groups or electrode elements (16, 17) disposed in the flow-through passageway, the electrode elements (16) of said first group being interleaved with and spaced from the electrode elements (17) of the second group and arranged to be at a potential different from that of said second group, said electrode elements (16, 17) of at least one of said first and second groups of electrode elements being made from or coated with a high-ohmic material,
   wherein the entire corona discharge electrode is axially spaced from the electrostatic precipitator.

2. Air cleaning apparatus according to claim 1, wherein the corona discharge electrode (21) is supported by a housing (11) which encloses the electrostatic precipitator (12).

3. Air cleaning apparatus according to claim 2, wherein the corona discharge electrode (21) is disposed adjacent an inlet to the flow-through passageway (18).

4. Air cleaning apparatus according to claim 2, wherein the corona discharge electrode (21) is disposed on an exterior wall of the housing (11).

5. Air cleaning apparatus according to any one of claims 1 to 4, wherein the electrode elements of at least one of said first and second groups of electrode elements (16, 17) are made of a fibrous material.

6. Air cleaning apparatus according to claim 5, wherein the electrode elements of at least one of said first and second groups of electrode elements (16, 17) have an individual, high-ohmic connection with the high-voltage source (15).

7. Air cleaning apparatus according to claim 1, wherein the corona discharge electrode (21) and the electrostatic precipitator (12) are each connected to said high-voltage source (15).

8. Air cleaning apparatus according to claim 7, wherein the electrostatic precipitator (12) forms a unit with an air transporting device (13) for transporting air through the flow-through passageway (18) of the precipitator (12).

9. An air cleaning apparatus comprising:
   an ionizing device having a unipolar ion source formed by a corona discharge electrode arranged such that ions generated at the electrode can diffuse in at least one direction essentially freely and uninhibited by any barrier away from the electrode into the space containing the air to be cleaned,
   an electrostatic precipitator connected to a high-voltage source, said electrostatic precipitator defining a flow-through passageway for air to be cleaned and including first and second groups of electrode elements disposed in the flow-through passageway, the electrode elements of said first group being interleaved with and spaced from the electrode elements of the second group and arranged to be at a potential different from that of said second group, said electrode elements of at least one of said first and second groups of electrode elements being made from or coated with a high-ohmic material, and
   a housing enclosing the electrostatic precipitator, and
   wherein the entire corona discharge electrode is disposed exterior to the housing.

10. The air cleaning apparatus of claim 9, wherein the corona discharge electrode is disposed adjacent an inlet to the flow-through passageway.

11. The air cleaning apparatus of claim 9, wherein the electrode elements of at least one of said first and second groups of electrode elements is made of a fibrous material.

12. The air cleaning apparatus of claim 9, wherein the corona discharge electrode is mounted on an exterior surface of the housing.

13. An air cleaning apparatus comprising:
   an electrostatic precipitator connected to a high-voltage source, said electrostatic precipitator defining a flow-through passageway for air to be cleaned and including first and second groups of electrode elements disposed in the flow-through passageway, the electrode elements of said first group being interleaved with an spaced from the electrode elements of the second group and arranged to be at a potential different from that of said second group, said electrode elements of at least one of said first and second groups of electrode elements being made from or coated with a high-ohmic material;
   an ionizing device axially spaced from the electrostatic precipitator, said ionizing device including a corona discharge electrode supported by an insulating holder surrounded by a conductive excitation electrode, said corona discharge electrode being connected to a positive terminal of said high voltage source, and said excitation electrode being connected to a grounded negative terminal of said high-voltage source, said corona discharge electrode being arranged such that ions generated at the electrode can diffuse essentially freely away from the electrode; and
   a fan for transporting air through the flow-through passageway of the precipitator, said fan being disposed downstream of the electrostatic precipitator.

14. The air cleaning apparatus of claim 13, wherein the corona discharge electrode is disposed exterior to the housing.

15. The air cleaning apparatus of claim 14, wherein the corona discharge electrode is disposed adjacent an inlet to the flow-through passageway.

16. The air cleaning apparatus of claim 13, wherein the electrode elements of at least one of said first and second groups of electrode elements is made of a fibrous material.

* * * * *